United States Patent
Cassiolato et al.

(10) Patent No.: US 7,035,693 B2
(45) Date of Patent: Apr. 25, 2006

(54) FIELDBUS RELAY ARRANGEMENT AND METHOD FOR IMPLEMENTING SUCH ARRANGEMENT

(75) Inventors: Cesar Cassiolato, Ribeirao Preto (BR); Edson Emboaba De Oliveira, Ribeirao Preto (BR); Libanio Carlos De Souza, Sertãozinho (BR); Marcelo Luis Dultra, Tomball, TX (US)

(73) Assignee: Smar Research Corporation, Holbrook, NY (US)

( * ) Notice: Subject to any disclaimer, the term of this patent is extended or adjusted under 35 U.S.C. 154(b) by 483 days.

(21) Appl. No.: 10/350,376

(22) Filed: Jan. 23, 2003

(65) Prior Publication Data

US 2004/0148041 A1    Jul. 29, 2004

(51) Int. Cl.
*G05B 15/00*        (2006.01)

(52) U.S. Cl. .................. 700/1; 700/2; 700/17; 700/19; 700/20; 700/83; 702/122; 370/465; 370/410; 370/420

(58) Field of Classification Search ............... 700/2, 700/5, 17, 18, 19, 28, 83, 80–82, 1; 702/122; 370/465, 410, 420, 462, 463; 717/5, 9–11
See application file for complete search history.

(56) References Cited

U.S. PATENT DOCUMENTS

| | | | |
|---|---|---|---|
| 4,749,992 A | | 6/1988 | Fitzemeyer et al. |
| 5,164,875 A | | 11/1992 | Haun et al. |
| 5,638,295 A | | 6/1997 | Lagree et al. |
| 6,026,352 A | * | 2/2000 | Burns et al. ................. 702/182 |
| 6,047,222 A | * | 4/2000 | Burns et al. ................... 700/79 |
| 6,360,277 B1 | | 3/2002 | Ruckley et al. |
| 6,452,493 B1 | | 9/2002 | Ma et al. |
| 6,510,351 B1 | * | 1/2003 | Blevins et al. ................. 700/18 |
| 6,691,183 B1 | * | 2/2004 | Ryan, Jr. ...................... 710/35 |
| 6,788,980 B1 | * | 9/2004 | Johnson ......................... 700/1 |
| 6,912,671 B1 | * | 6/2005 | Christensen et al. ........... 714/25 |
| 2003/0171827 A1 | * | 9/2003 | Keyes et al. ................... 700/19 |
| 2004/0236885 A1 | * | 11/2004 | Fredriksson et al. ......... 710/100 |

* cited by examiner

*Primary Examiner*—Ramesh Patel
(74) *Attorney, Agent, or Firm*—Dorsey & Whitney LLP

(57) ABSTRACT

An arrangement operable to communicate with a fieldbus network and operate an attached relay and a method for implementing such arrangement is provided. The arrangement and method provide conventional discrete outputs from a fieldbus device using standard fieldbus function blocks, such as those used for Foundation® and Profibus® fieldbus networks. The arrangement and method may facilitate the integration of traditional discrete relay functions into these more advanced digital fieldbus networks, and also utilize additional functions available to standard Foundation® fieldbus and Profibus® fieldbus network devices.

25 Claims, 8 Drawing Sheets

FIELDBUS RELAY ARRANGEMENT AND METHOD FOR IMPLEMENTING SUCH ARRANGEMENT

FIELD OF THE INVENTION

The present invention relates generally to a fieldbus relay arrangement. In particular, the invention is directed towards a fieldbus relay arrangement and method for implementing such arrangement which makes discrete outputs available using standard function blocks in Foundation® fieldbus and Profibus® fieldbus networks, and which can further utilize the additional functions available to standard Foundation® fieldbus and Profibus® fieldbus network devices.

BACKGROUND OF THE INVENTION

The Use of Fieldbus for Process Control Applications

Process control systems and methods provide a way for ensuring efficiency, reliability, profitability, quality and safety in a process/product manufacturing environment. Such process control systems and methods can be used for automation, monitoring and control in a wide array of industrial applications for many industry segments, including textiles, glass, pulp and paper, mining, building, power, sugar, food and beverage, oil and gas, steel, water and wastewater, chemicals, etc.

The conventional process control systems and methods generally operate with a plurality of field devices positioned at various locations on, e.g., a 4–10 mA analog network. These devices include measurement and control devices (such as temperature sensors, pressure sensors, flow rate sensors, control valves, switches, etc., or combinations thereof). Recently, a number of protocols have been introduced which provide a digital alternative to conventional control systems and methods, and which utilize "smart" field devices. These "smart" field devices can provide the same functionality as the conventional devices listed above, and may additionally include one or more microprocessors, one or more memories, and other components incorporated therein. Such smart field devices can be communicatively coupled to each other and/or to a central processor using an open smart communications protocol. These protocols (e.g. FOUNDATION® Fieldbus protocol) have been widely used in manufacturing and process plants. Many of such protocols were developed for non-process control environments, such as automobile manufacturing or building automation, and were later adapted to be used for process control. Some of the more widely used fieldbus protocols include HART®, PROFIBUS®, FOUNDATION® Fieldbus, Controller Area Network protocols, etc.

Fieldbus process control systems and methods may also utilize a controller communicatively coupled to each of the smart field devices using an open, "smart" communications protocol, and a server communicatively coupled to the controller using, for example, an Ethernet connection. Moreover, this controller may include a processor, and can receive data from each of the "smart" field devices. These "smart" field devices preferably include a processor for performing certain functions thereon, without the need to use the central host for such functions. The amount of processing by the centralized host generally depends on the type of a control application and protocol used.

A smart fieldbus device, as configured by a software configurator, may be programmed to execute function blocks. A function block provides the fundamental automation functions that are performed by the process control application—function blocks are essentially a software model which defines the behavior of the process control system. More particularly, the function block is a software logic unit which processes input parameters according to a specified algorithm and an internal set of control parameters, and produces resulting output parameters that are available for use within the same function block application or by other function block applications. The input parameters of one function block may be linked to the output parameters of other function blocks on the fieldbus. The execution of each function block can be scheduled. After the function block is executed using the corresponding input values, its outputs are updated and then broadcast on the network, where they can be read by inputs of other function blocks using this information. These linked function blocks may reside either inside the same field device or in different devices on the network.

The function blocks replace many of the functions which were traditionally performed by hardware. They provide flexibility in a process control environment, since they may be modified, added or removed, without having to rewire or change the hardware of the system. Different function blocks are defined for use in FOUNDATION® fieldbus and PROFIBUS® fieldbus networks. For example, the Fieldbus Foundation establishes a set of ten standard function blocks for basic control, which are specifically defined in the FF-891 Function Blocks—Part 2 specification. This initial set of 10 function blocks released by the Fieldbus Foundation generally addresses over 80 percent of the basic process control configurations. An additional 19 standard function blocks for advanced control are defined in the FF-892 Function Blocks—Part 3 specification.

Three different types of function blocks are used in the fieldbus applications. For example, Resource Blocks define parameters that pertain to the entire application process (e.g., manufacturing ID, device type, etc.). Function Blocks encapsulate control functions (e.g., PID controller, analog input, etc.). Transducer Blocks represent an interface to sensors such as temperature, pressure and flow sensors.

Each function block in the system is identified by a unique tag which is assigned by the user. The parameters of each function block are represented by object descriptions that define how the parameters are communicated on the fieldbus network. Thus, many parameters in the system are uniquely identified by their reference to their block tag and parameter name.

Each fieldbus device likely has a Resource Block and at least one Function Block with input and/or output parameters that link to other function blocks, either in the same device or in separate devices by using the bus. Each input/output parameter includes a particular value portion and a particular status portion. The status portion of each parameter includes information regarding the reliability of the data contained in the input/output parameter, and instructs the receiving function block as to whether the reliability of contained data is acceptable, uncertain or unacceptable. In addition, a Function Block Application Process ("FBAP") can specify the handling of control modes, alarms, events, trend reports and views. These features comply with the FOUNDATION® Fieldbus specification in order for the device to be considered interoperable at a User Layer.

Distribution of control to the field devices can be performed by synchronizing the execution of the function block and transmitting the function block parameters on the fieldbus network. Such function, along with the publication of the time of day to the devices, an automatic switch over to a redundant time publisher, an automatic assignment of device addresses, and a search for parameter names or "tags" on the fieldbus, are generally handled by System Management and Network Management.

A control strategy may be created through the interconnection of various function blocks contained by the field devices. The control strategy may also be modified without any hardware changes, thus providing another level of flexibility. The creation of the function blocks and control strategies further includes the automatic assignment of device addresses and parameter indexes. The function blocks and control strategies are described in the FOUNDATION® fieldbus and PROFIBUS® fieldbus specifications, both of which are incorporated herein by reference.

Relays

Relays are used in process control and other applications to control a load in response to a control line input as well as to control various conventional devices, such as alarm generators, limit switches and motors. Many types of relays are unintelligent devices that merely conduct a load current when an input voltage is above or below a particular threshold input value. An early conventional relay is generally an electromechanical device in which a solenoid is used to connect two switch contacts. Recently, solid state relays have become more widely used. However, these conventional relay devices are not compatible with the advanced technologies that have recently been developed for intelligent process automation and control.

Some relays may contain microprocessors and memory, and can perform logic functions: such relays are described in U.S. Pat. No. 6,360,277 the entire disclosure of which is incorporated herein by reference. The relays described in this publication are addressable, can store various protocols internally, and may therefore be inter-operable with various different process control networks. These relays can provide standard discrete outputs for the fieldbus network.

However, no fieldbus relay exists which can be easily integrated into a fieldbus control scheme by executing fieldbus function blocks, receiving power from the fieldbus network, and performing various other functions which are generally performed by FOUNDATION® or PROFIBUS® fieldbus devices. Such relay may allow the system to be homogenous, and can simplify a control strategy configuration by enabling a seamless integration of traditional discrete-controlled components into an advanced FOUNDATION® fieldbus or PROFIBUS® fieldbus process control scheme.

SUMMARY OF THE INVENTION

Therefore, a need has arisen to provide a relay arrangement and method which overcomes the above-described and other shortcomings of the conventional systems and processes. According to an exemplary embodiment of the present invention, a fieldbus relay arrangement is provided. The arrangement provides conventional discrete outputs using standard fieldbus function blocks. In one exemplary embodiment of the present invention, the fieldbus relay arrangement includes a central processing unit, a storage arrangement and a relay. The arrangement can execute standard function blocks, and may control outputs of the relay based on this execution. In one exemplary variation, the arrangement may include multiple processors which can be dedicated to various tasks, such as for a communications with the fieldbus network or for processing the function blocks. Additionally, the arrangement may include various types of storage arrangements, e.g., flash memory, RAM, ROM, and EEPROM. The exemplary embodiment of the fieldbus relay arrangement according to the present invention can operate in a manner similar to that of other Foundation® or Profibus® fieldbus devices, e.g., the arrangement may obtain power from the fieldbus, transmit status information via standard status variables defined in the FOUNDATION® and PROFIBUS® fieldbus specifications, etc.

The exemplary embodiment of the fieldbus relay arrangement according to the present invention may execute a plurality of fieldbus function blocks. These function blocks may include resource blocks, edge trigger and flip-flop blocks, analog alarm blocks, timer blocks, discrete output blocks, arithmetic blocks, input selector blocks, Proportional-Integral-Derivative (PID) control blocks and step-output PID control blocks, etc.

In another exemplary embodiment according to the present invention, the arrangement may include one or more optically-isolated solid-state relays. The relays may be operated automatically based on the operation of the function block, and/or manually using a tool which can magnetically activate the relays of the arrangement. The arrangement may further include a liquid-crystal display (LCD) for displaying certain information (e.g., device status, etc.).

One of the advantages of the present invention is that the fieldbus relay can be considered as any other device on the FOUNDATION® or PROFIBUS® fieldbus, and may be operated with the same advanced level of control as any other fieldbus device. Fieldbus control strategies can thereby be configured with uniformity. Further, a conversion of existing control systems to FOUNDATION® or PROFIBUS® fieldbus systems can be simplified since a modification of existing output field elements is likely minimized. The use of the fieldbus relay arrangement according to the present invention makes the use of conventional discrete-controlled devices completely transparent at the fieldbus control configuration level.

BRIEF DESCRIPTION OF THE DRAWINGS

For a more complete understanding of the present invention, the objects satisfied thereby, and further objects, features, and advantages thereof, reference now is made to the following descriptions taken in connection with the accompanying drawings.

DETAILED DESCRIPTION

Preferred embodiments of the present invention and their advantages may be understood by referring to FIGS. 1–8, like numerals being used for like corresponding parts in the various drawings.

Figure 1:
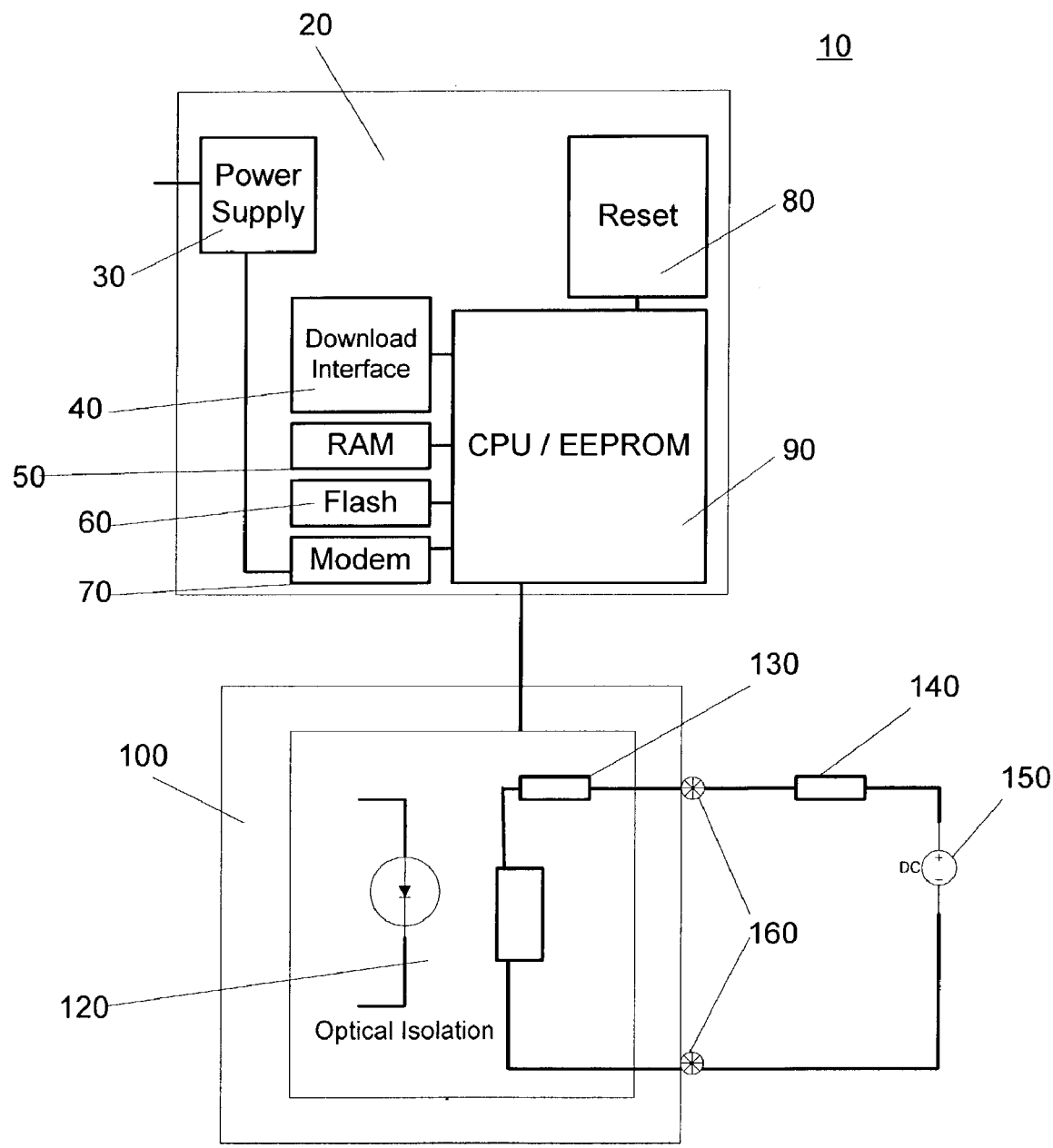
FIG. 1 is a block diagram of a first exemplary embodiment of a fieldbus relay arrangement according to the present invention.

FIG. 1 shows a first exemplary embodiment of a fieldbus relay arrangement 10 according to the present invention. This exemplary fieldbus relay arrangement 10 includes a main circuit board 20 which has coupled thereto or contains therein certain components such as power supply and signal shaper 30, a firmware download interface 40, a flash memory 50, a random access memory (RAM) 60, a modem 70, a factory reset module 80, as well as a central processing unit (CPU) with electrically erasable programmable read-only memory (EEPROM) 90. In addition to the main circuit board 20, the relay arrangement 10 may include a relay apparatus 100 that has an optical isolation circuit 120 and a fuse 130. Output connectors 160 are provided for connecting a load 140 and a power supply 150 in parallel with the relay arrangement 10 of the present invention for switching purposes in a FOUNDATION® or PROFIBUS® fieldbus network.

In particular, the control components of the main circuit board 20 are operable to perform various control and communications functions, including storing and modifying certain status variables, executing fieldbus function blocks, communicating with other field devices on the H1 fieldbus network, etc. For example, an executing function block can instruct the CPU 90 to control the switching operation in the relay apparatus 100, thus affecting the outputs 160 and the load 140 in an output circuit.

Figure 2:
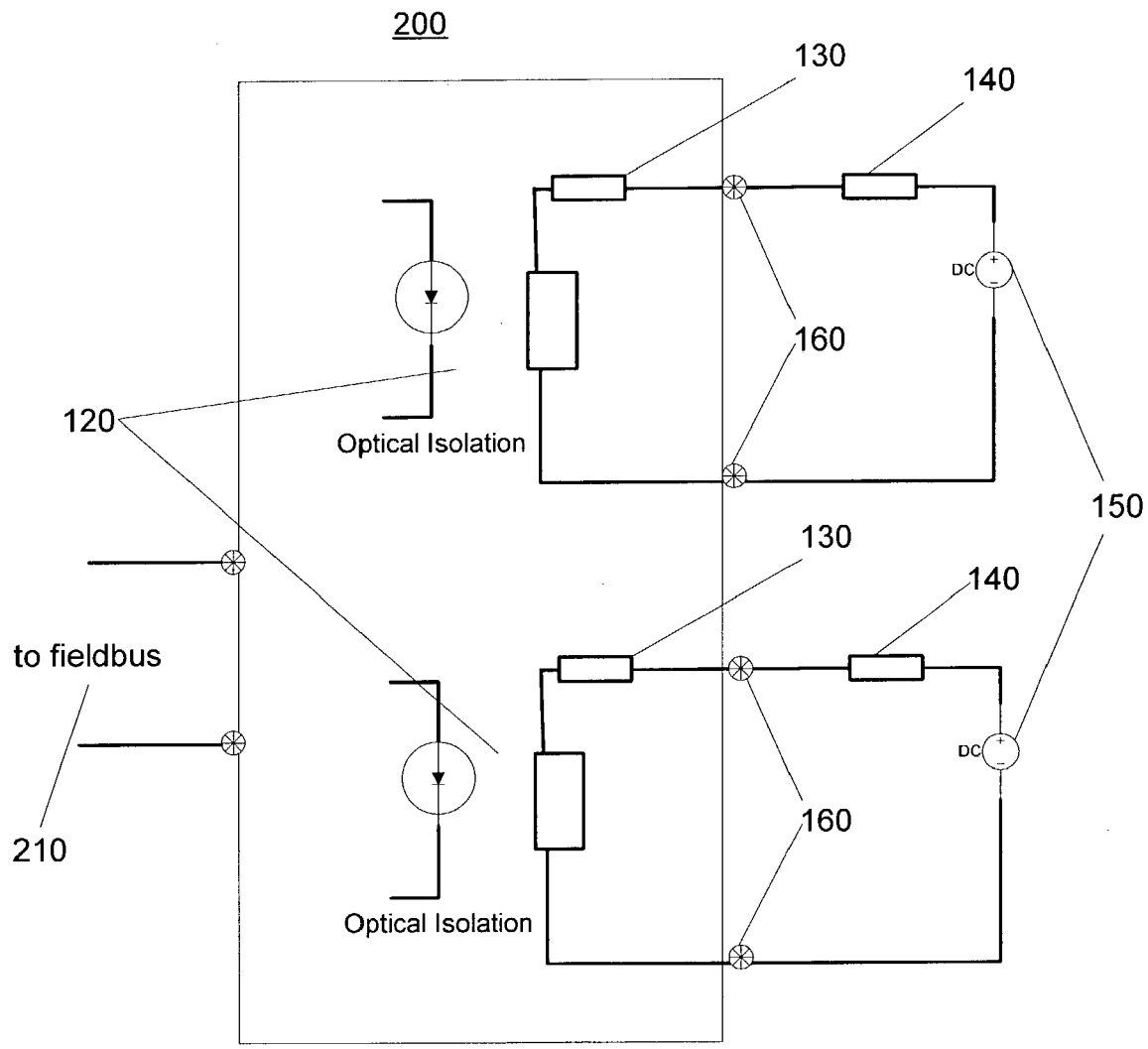
FIG. 2 is a block diagram of a second exemplary embodiment of the fieldbus relay arrangement according to the present invention.

FIG. 2 shows a block diagram of a second exemplary embodiment of the fieldbus relay arrangement 200 according to the present invention. In this exemplary embodiment, the output circuit can include two separate relay outputs. For example, the fieldbus interface 210 can connect the fieldbus relay arrangement 200 to the fieldbus network. The output circuit may include two or more optical isolation circuits 120 and two or more fuses 130, each connected in parallel with the respective loads 140 and power supplies 150 via the respective output connectors 160 of the relay arrangement of the present invention for executing the switching operations. It should be understood by those skilled in the art that power supply 150 can be either an A.C. or D.C. power supply.

Figure 3:
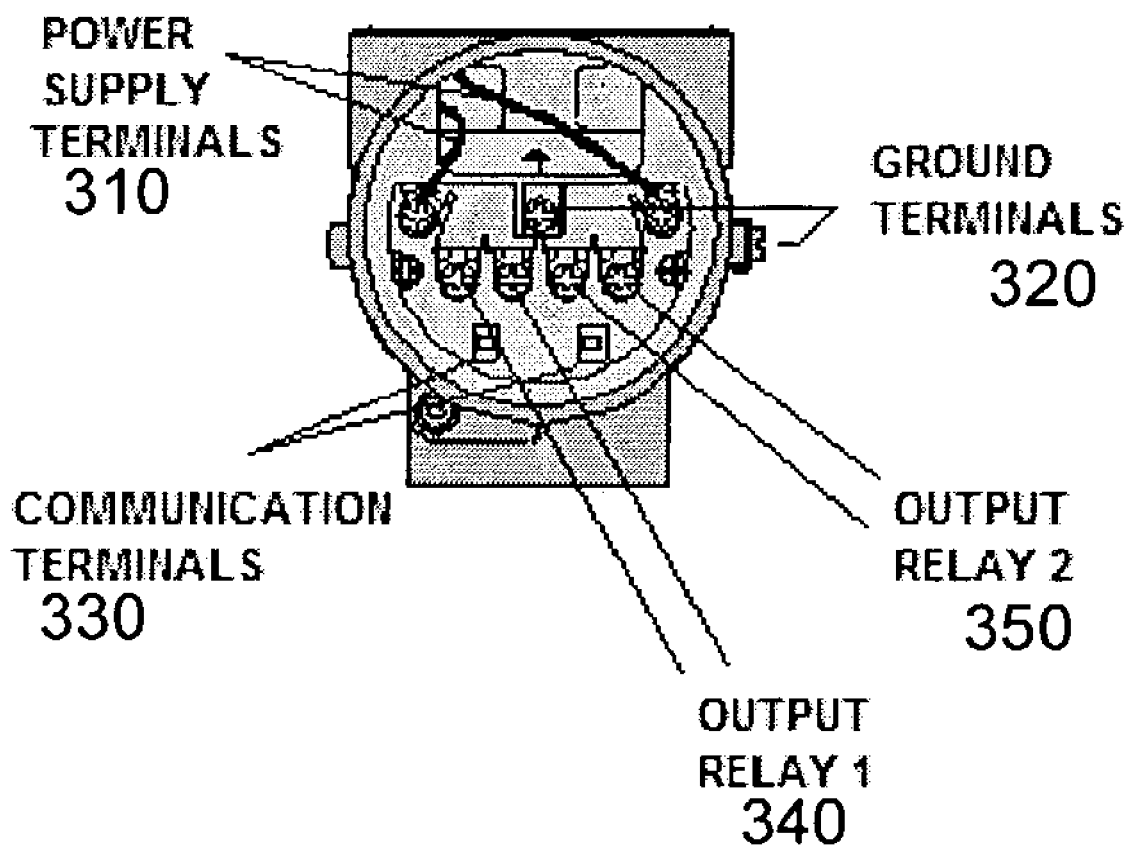
FIG. 3 is a front view of a third exemplary embodiment of the fieldbus relay arrangement according to the present invention showing the physical connectors of the arrangement.

FIG. 3 shows a front view of a third exemplary embodiment of the fieldbus relay arrangement 300 according to the present invention which may include a plurality of exterior electrical connectors. An external power supply may be connected to power supply terminals 310 so as to provide power for the exemplary relay arrangement 300. Communication terminals 330 may be used for coupling the relay arrangement 300 to the fieldbus networks to, e.g., communicate with other field devices on the FOUNDATION® or PROFIBUS® fieldbus network. Relay output terminals 340 and 350 can be provided as discrete outputs, and may facilitate a switching functionality from the respective relays of the relay arrangement 300.

Figure 4:
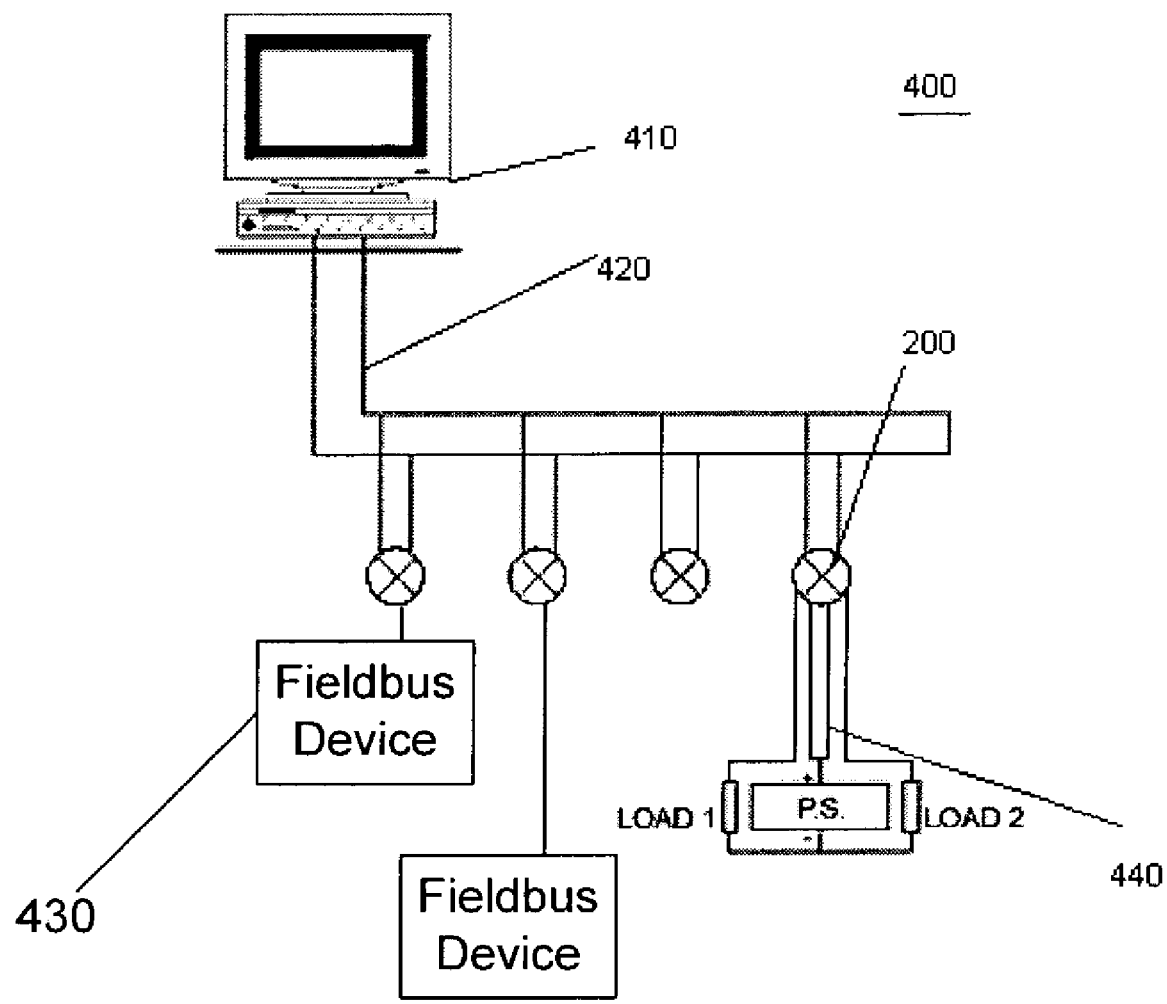
FIG. 4 is a block diagram of an exemplary embodiment of a portion of the fieldbus relay arrangement according to the present invention coupled to a fieldbus network.

FIG. 4 illustrates an exemplary portion of any one of the fieldbus relay arrangements of FIGS. 1–3 as integrated into an exemplary fieldbus network 420 (e.g., the FOUNDATION® or PROFIBUS® fieldbus networks). A computer 410 may be coupled to the fieldbus network 420 for configuring and controlling fieldbus field devices 430 attached thereto. The exemplary fieldbus relay arrangement 100, 200, or 300 can be coupled to the fieldbus network 420. An output circuit 440 of Fieldbus relay arrangement 200 may include two or more loads connected to a power supply. The fieldbus relay arrangement of FIG. 4 may communicate with the fieldbus network 420 in the same manner as any other field device 430. Also, in accordance with the execution results of the function blocks, this fieldbus relay arrangement can switch the relays 200 connected at the output circuit 440.

Figure 5:
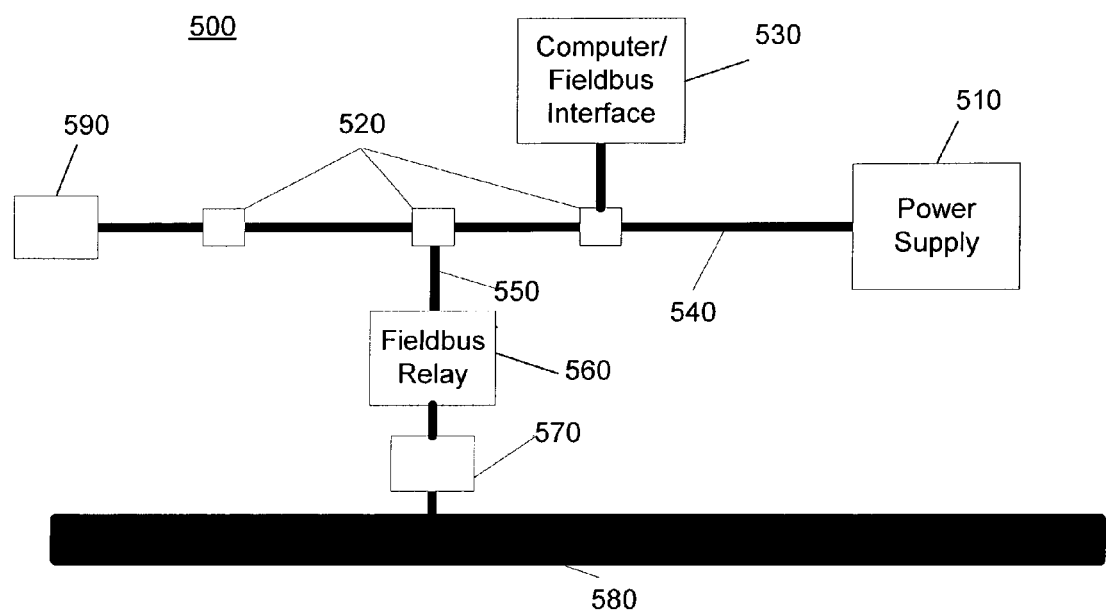
FIG. 5 is an exemplary fieldbus installation that includes an exemplary embodiment of the fieldbus relay arrangement of FIGS. 1–3.

FIG. 5 shows another exemplary embodiment of one or more fieldbus relay arrangements 560 according to the present invention, which is illustrated as being integrated into an exemplary fieldbus process control scheme 500. In this scheme 500, a power supply 510 can be utilized to provide power to the fieldbus network. Interface devices or cards 530 may be installed into or connected to a computer (e.g., personal computer, server, etc.), and facilitate the control and configuration of the fieldbus network and devices situated thereon using a software configuration program (e.g., Smar Research's Syscon software). Trunks 540 and spurs 550 may be used to interconnect segments of the fieldbus network and a plurality of devices, and junction boxes 520 can provide junctions for the branches in the fieldbus network. The exemplary fieldbus relay arrangements 560 are coupled to the fieldbus network via the spurs 550, which may provide power to the relay arrangements and communications with the other field devices attached to the fieldbus network. In addition, these fieldbus relay arrangements 560 may execute the function blocks in accordance with the configuration set forth in the FOUNDATION® or PROFIBUS® fieldbus specification. Also, the function blocks can direct the fieldbus relay arrangements 560 to switch their outputs to control the conventional discrete process control devices 570. In one example, the process control devices 570 may be used to monitor and control the flow of a liquid through a conduit 580 attached thereto.

Figure 6:
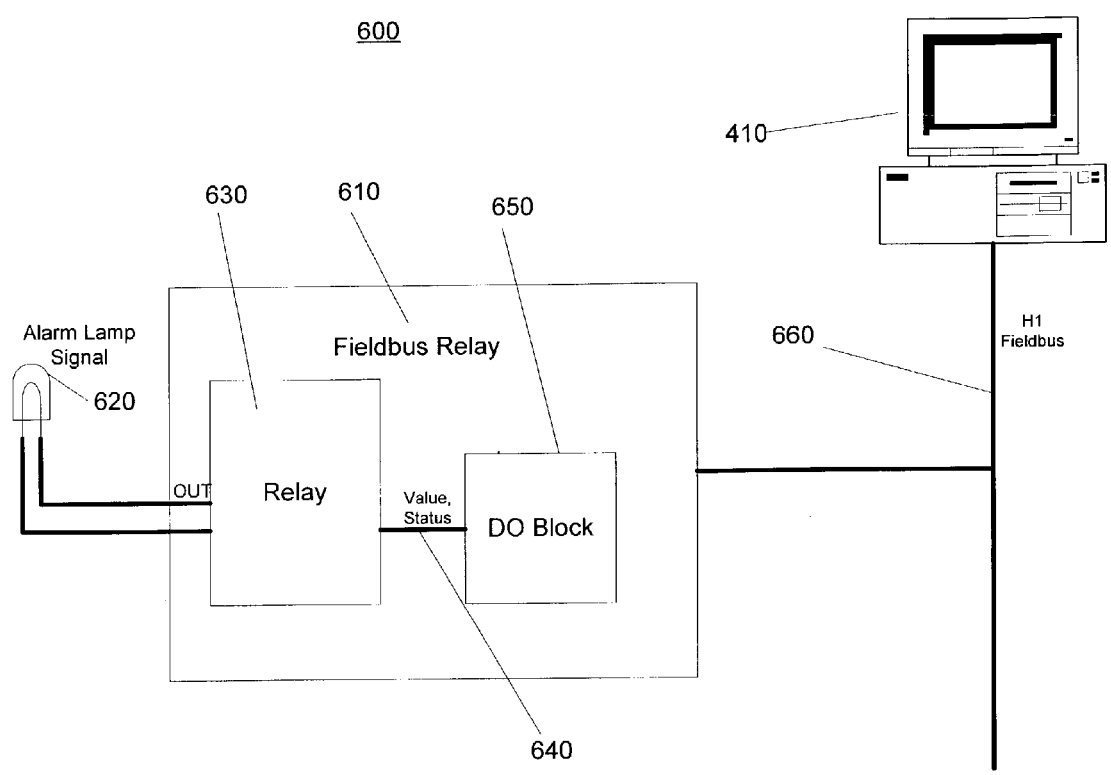
FIG. 6 is a block diagram of a fourth exemplary embodiment of the fieldbus relay arrangement according to the present invention that can be used for switching to a conventional output device.

FIG. 6 shows a block digram of an exemplary embodiments of a fieldbus control system 600 according to the present invention. This control system includes the computer 410 which is used to monitor, control a configure a fieldbus network 660 (e.g, the fieldbus network). As provided in this exemplary embodiment, a fieldbus relay arrangement 610 includes a discrete output (DO) function blocks 650. This fieldbus relay arrangement 610 may execute the instructions of the function block 650, and communicate data such as an output value and status variable (corresponding with such execution) to a relay apparatus 630, which may, in turn, switch the relay output to, e.g., enable or disable an alarm signal lamp 620 in response to a particular condition.

Figure 7:
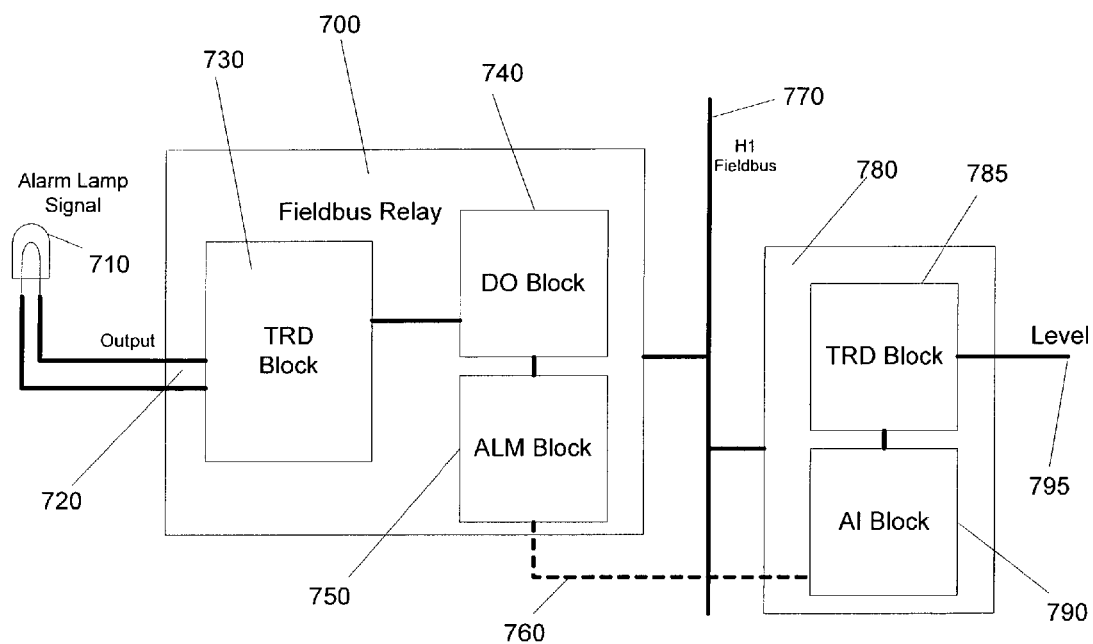
FIG. 7 is a block diagram of a fifth exemplary embodiment of the fieldbus relay arrangement according to the present invention that can be used for switching to a conventional output device in an alarm-type application.

FIG. 7 illustrates another exemplary embodiments of a fieldbus relay arrangement 700 for an alarm detection according to the present invention which is connected to a fieldbus network 770 and to a pressure sensor fieldbus device 780. In particular, the pressure sensing fieldbus device 780 may include a transducer ("TRD") function block 785 and an analog input ("AI") function block 790. This pressure sensing fieldbus device 780 may be used to monitor a pressure level 795, and may transmit a signal 760 to the fieldbus relay arrangement 700 when a particular predetermined alarm condition occurs. The signal 760 can be received by an alarm function block 750 which can send an output signal to a discrete output (DO) function block 740. The DO function block 740 can transmit a signal to a transducer block 730 which is coupled to an output 720 of the fieldbus relay arrangement 700. An alarm signal lamp 710 can be connected to the output 720 of the fieldbus relay arrangement 700, and may be illuminated due to the occurrence of the predefined alarm condition. Numerous other discrete devices may be used instead of or in addition to the alarm signal lamp 710, as would be understood by those skilled in the art.

Figure 8:
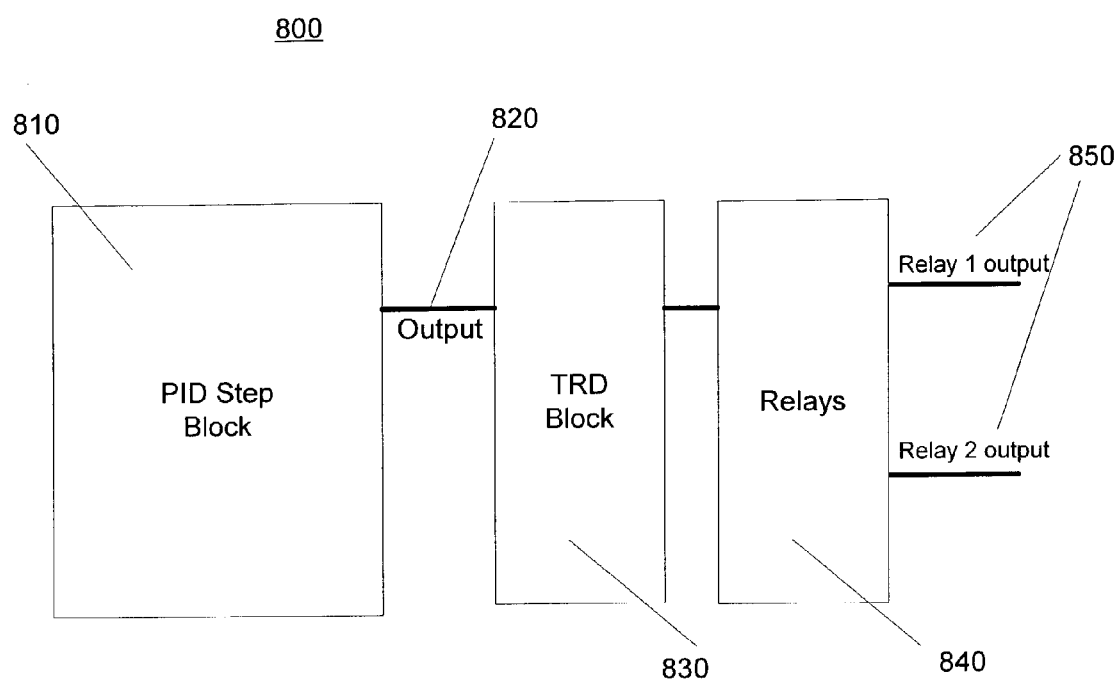
FIG. 8 is a block diagram of a sixth exemplary embodiment of the fieldbus relay arrangement according to the present invention that can be used for PID-step applications.

Referring to a block diagram of FIG. 8, another exemplary embodiment of the fieldbus relay arrangement of the present invention is illustrated, which may be used when, e.g., a final control element has an actuator that can be driven by an electric motor with an actual position feedback. The final control element may be positioned by rotating the motor clockwise or counter-clockwise. This positioning may be accomplished by activating a discrete signal of the motor for each direction. For example, a control valve may use one control signal to open and another control signal to close itself. Also, when no signal is applied, the valve may be configured to maintain its current position. The exemplary embodiment of the fieldbus relay arrangement 800 of FIG. 8 includes two discrete relay outputs 850, and thus can be utilized to implement such exemplary operation. A proportional/Integral/Derivative (PID) Step control block 810 may provide an output 820 to a transducer block (TRD) 830. This transducer block 830 may be used to convert the control signal into a form suitable for controlling the motor which is connected to relay outputs 850 of a relay module 840 of the fieldbus relay arrangement 800.

The exemplary embodiments of the fieldbus relay arrangements of the present invention can be used in a variety of process control applications which are not necessarily related to manufacturing processes. For example, the relay arrangement may be utilized for a building automation process and operation. In particular, such arrangement may be used to control the opening and closing of solenoid valves for water and gas control in an apartment building, in a manner similar to that described above with reference to the relay arrangement of FIG. 5 for controlling a flow of a liquid. A variety of other building automation applications could be used as is apparent to those with ordinary skill in the art.

What is claimed is:

1. An arrangement operable to communicate with a fieldbus network, comprising:
   at least one processor capable of receiving fieldbus function blocks; and
   at least one relay which is at least one directly or indirectly coupled to the at least one processor,
   wherein the at least one processor is capable of controlling the at least one relay using at least one of the fieldbus function blocks.

2. The arrangement of claim 1, wherein the at least one processor receives power from the fieldbus network.

3. The arrangement of claim 1, wherein the fieldbus network operates according to a particular protocol, and configured to make available status data, and wherein the at least one processor generates the status data.

4. The arrangement of claim 1, wherein the at least one processor monitors line activity on the fieldbus network, demodulates at least a first signal received from the fieldbus network, and modulates at least a second signal provided to the fieldbus network.

5. The arrangement of claim 1, wherein the at least one processor performs management functions.

6. The arrangement claimed in claim 1, wherein the at least one relay is an optically isolated solid state relay.

7. The arrangement of claim 1, further comprising a liquid crystal display capable of receiving data from the at least one processor.

8. The arrangement of claim 1, wherein the at least one relay is capable of being activated by a magnetic tool.

9. The arrangement of claim 1, further comprising at least one memory communicatively coupled to the at least one processor.

10. The arrangement of claim 9, wherein the at least one memory includes a random-access memory (RAM).

11. The arrangement of claim 9, wherein the at least one memory includes a read-only memory (ROM).

12. The arrangement of claim 9, wherein the at least one memory includes a flash memory.

13. The arrangement of claim 9, wherein the at least one memory includes an electronically erasable/programmable read-only memory (EEPROM).

14. The arrangement of claim 1, wherein the function blocks which may be utilized by the at least one processor include at least one of a resource block, a flip flop and edge trigger block, an analog alarm block, a timer block, a discrete output block, an arithmetic block, an input selector block, a PID control block, and a step output PID block.

15. The arrangement of claim 1, wherein the at least one relay is configured to control at least one device which is incapable of at least one being connected to or operating on the fieldbus network, and wherein the at least one relay is controlled by the at least one processor to control the at least one device.

16. A method for operating at least one relay coupled to a fieldbus network, comprising:
   executing at least one fieldbus function block; and
   operating the at least one relay based on at least one output of the execution of the at least one fieldbus function block.

17. The method of claim 16, wherein the at least one processor receives power from the fieldbus network.

18. The method of claim 16, wherein the fieldbus network operates according to a particular protocol, and configured to make available status data, and wherein the at least one processor generates the status data.

19. The method of claim 16, wherein the at least one processor monitors line activity on the fieldbus network, demodulates at least a first signal received from the fieldbus network, and modulates at least a second signal provided to the fieldbus network.

20. The method of claim 16, wherein the at least one processor performs management functions.

21. The method of claim 16, wherein the at least one relay is an optically isolated solid state relay.

22. The method of claim 16, wherein the at least one relay is capable of being activated by a magnetic tool.

23. The method of claim 16, wherein the function blocks which are executed include at least one of a resource block, a flip flop and edge trigger block, an analog alarm block, a timer block, a discrete output block, an arithmetic block, an input selector block, a PID control block, and a step output PID block.

24. The method of claim 16, further comprising controlling at least one device using the at least one relay, wherein the at least one device is incapable of at least one being connected to or operating on the fieldbus network, and wherein the at least one relay is controlled by the at least one processor to control the at least one device.

25. The method of claim 16, wherein the execution of the at least one fieldbus function block and the operation of the at least one relay are performed within a single field device.

* * * * *